United States Patent Office 3,521,155
Patented July 21, 1970

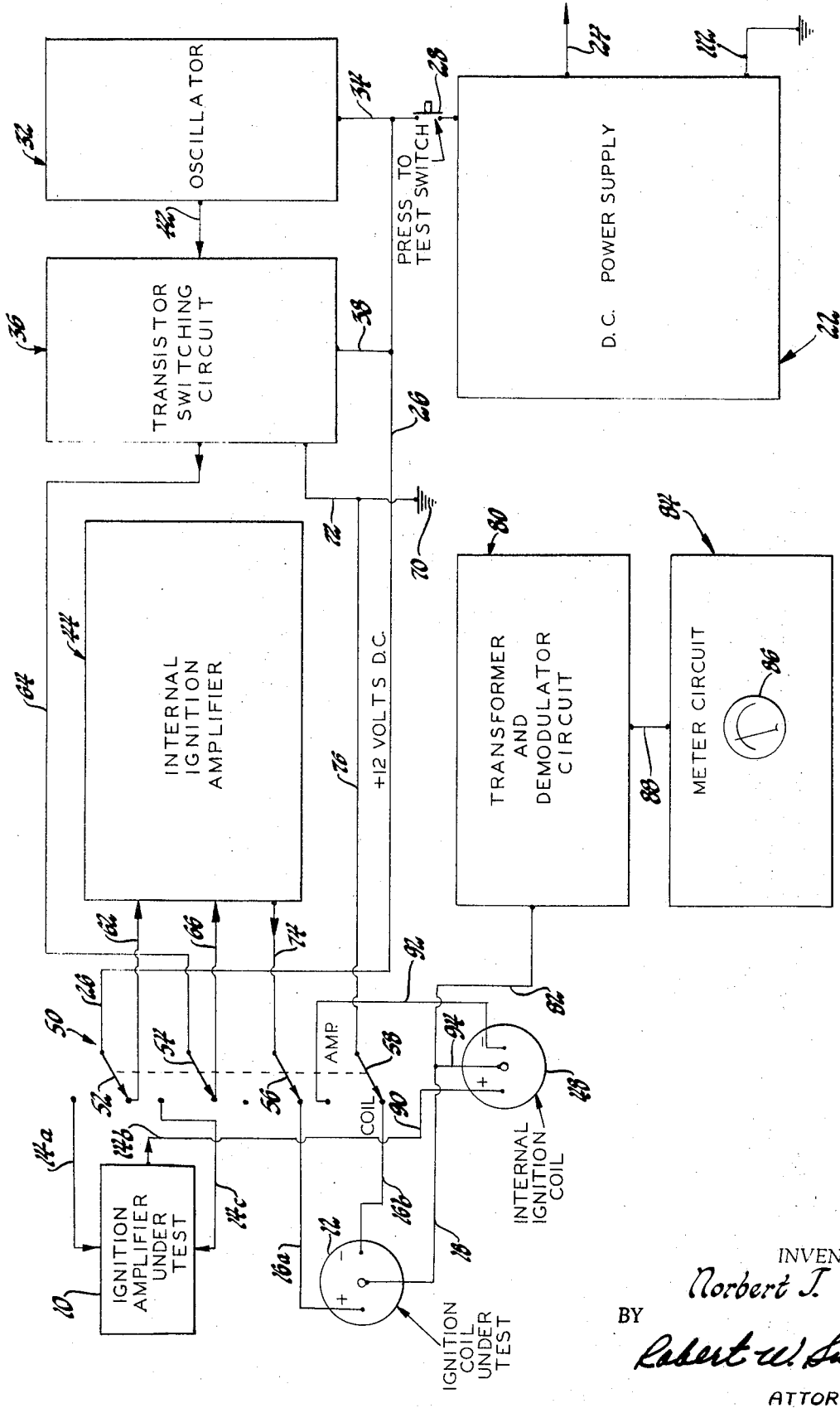

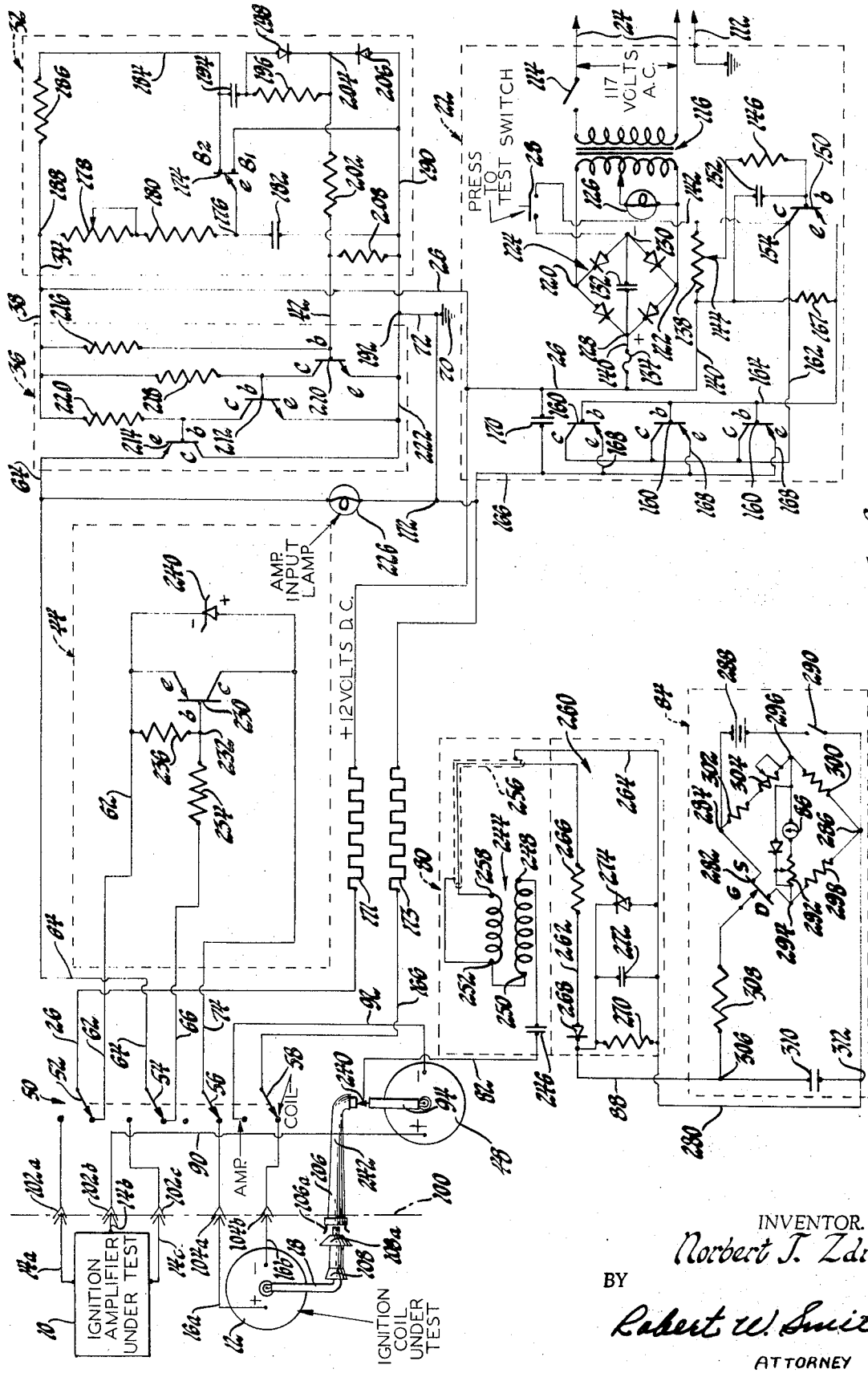

3,521,155
IGNITION AMPLIFIER AND COIL TESTER
Norbert J. Zdral, Inkster, Mich., assignor to General Motors Corporation, Detroit, Mich., a corporation of Delaware
Filed Dec. 6, 1967, Ser. No. 688,433
Int. Cl. G01r 13/42
U.S. Cl. 324—15                                    3 Claims

ABSTRACT OF THE DISCLOSURE

In a preferred embodiment, a tester for dynamically testing semiconductor ignition amplifiers and ignition coils of ignition systems utilizing semiconductor elements is provided with both an internal semiconductor amplifier and an internal ignition coil each being substantially identical to the respective amplifier and coil to be tested. A two-position function selector switch connects either an ignition amplifier under test or an ignition coil under test into two testing circuit combinations including respectively the internal ignition coil or internal semiconductor amplifier. A D.C. power supply connected to a conventional A.C. source supplies D.C. power to the tester circuits and to the testing circuit combination. An oscillator controlled semiconductor switch circuit provides control of the ignition amplifiers and the outputs of either of the ignition coils is applied to a step down transformer and demodulator load circuit connected to a meter circuit. The meter circuit provides a visual meter indication of the condition of the ignition amplifier or coil being tested under dynamic ignition circuit input and load conditions.

---

This invention relates to ignition system testers and more particularly to tester circuits for semiconductor ignition amplifiers and ignition coils included in semiconductor ignition systems for vehicle internal combustion engines.

In many conventional semiconductor ignition systems employed on internal combustion engines, a semiconductor amplifier or switching circuit is connected between the input of a conventional type of ignition coil having primary and secondary windings and a battery power source. The semiconductor amplifier replaces conventional breaker contact points in conducting charging current to the ignition coil primary. Either the breaker contacts or control pulses responsive to the engine speed are utilized to provide appropriate control of the semiconductor amplifier circuit. The amplifier circuit makes and breaks the primary coil winding to charge and discharge the ignition coil. As is well known, after the primary winding is energized and then deenergized, the magnetic field developed within the ignition coil collapses and a high voltage pulse occurs at the high tension output of the ignition secondary coil winding. The high voltage pulse is discharged through a distributor switch and ignition lead wires to an appropriate spark plug of the internal combustion engine. It is accordingly desirable to test the semiconductor ignition system major components including the semiconductor amplifier and ignition coil under dynamic conditions corresponding to actual operating conditions rather than by static impedance and circuit continuity measurements.

Briefly, the ignition amplifier and coil tester of this invention includes a D.C. power supply, providing a voltage corresponding to a vehicle battery power supply and an oscillator which supplies pulses at a rate corresponding to the frequency of a high rate of spark plug firing matching a high engine speed. A semiconductor switching circuit controlled by the oscillator provides the switching operation provided by breaker contacts connected to a semiconductor ignition system amplifier. An internal semiconductor ignition amplifier and internal ignition coil both known to be in satisfactory condition and substantially identical to the amplifier and coil to be tested are connected to a function selector switch. The function selector switch connects the control inputs of either the internal or tested amplifier to the semiconductor switching circuit and also the amplifier outputs to either the tested or internal ignition coil. The high tension output puts leads from the internal ignition coil and coil under test are connected to a step-down transformer and demodulator circuit which provides a load substantially the same as provided for an ignition coil of a semiconductor ignition system in operation. A meter bridge circuit is connected to the output of the demodulator circuit to measure the ignition coil output voltage. When the semiconductor amplifier is satisfactorily charging and discharging the ignition coil and the coil is in proper condition, a high voltage coil output is indicated above a predetermined value, for example 6 kilovolts, on the bridge circuit output meter. With the tester switching circuit operating at a high frequency, for example 1000 Hz., corresponding to high engine speed, the tested ignition amplifier and ignition coil are subjected to severe operation and a marginal failure condition is detected prior to future use.

It is an object of this invention to provide an ignition tester for both a semiconductor ignition amplifier and an ignition coil which are tested under dynamic operating conditions.

Another object of this invention is to provide an ignition amplifier and coil tester wherein the component under test is operated at conditions corresponding to actual use in an engine ignition system operating at very high engine speeds.

Another object of this invention is to provide an ignition amplifier and coil tester which includes a function selector switch for testing alternately an ignition amplifier or an ignition coil respectively in combination with an ignition coil or ignition amplifier of normally satisfactory condition.

A still further object of this invention is to provide an ignition amplifier and coil tester wherein a function selector switch is provided to connect the ignition amplifier or ignition coil under test with an internal ignition coil or internal amplifier of normally satisfactory condition and in turn to a step-down transformer and demodulator circuit which substantially corresponds to the equivalent electrical load provided by a vehicle ignition system.

A still further object of this invention is to provide an ignition amplifier and ignition coil tester for selectively testing an amplifier or coil under test with respectively an ignition coil or amplifier of normally satisfactory condition and having the ignition coil high voltage output applied to a step-down transformer and demodulator circuit which substantially dissipates the high voltages and provides rectified low voltage signals to a high input impedance solid state meter circuit including a field effect transistor device. The condition of the ignition amplifier or coil under test is provided by a meter indication of the ignition coil output voltage above or below a predetermined value.

Further objects and advantages of the present invention will be apparent from the following description, reference being had to the accompanying drawings wherein a preferred embodiment of the present invention is clearly shown.

In the drawings:

FIG. 1 is a block diagram illustration of an ignition amplifier and coil tester of this invention.

FIG. 2 is a circuit diagram of an ignition amplifier and coil tester made in accordance with this invention.

Referring now to the drawings and more particularly to FIG. 1, there is shown a block diagram of the tester of the present invention. The refernce numerals 10 and 12 designate respectively a semiconductor ignition amplifier under test and an ignition coil unit under test. The semiconductor ignition amplifier 10 and ignition coil 12 are of the type utilized, by way of example, in an ignition system as described in the B. H. Short Pat. 3,218,513 issued Nov. 16, 1965, and assigned to the assignee of this invention. By reference to the above-identified patent, the ignition amplifier 10 includes a semiconductor power switching circuit that controls the current flow from a battery source to the primary winding of an ignition coil. The semiconductor circuit is controlled by a pair of breaker contacts which cause the circuit to be biased respectively conductive and nonconductive when the contacts are closed and opened.

The ignition amplifier 10 under test is connected to the tester of this invention by an "amplifier" cable having leads designated by lines 14a and 14b respectively connected with the amplifier power input and output connections and line 14c connected to the amplifier control input. Ignition coil 12 under test is a conventional type having primary and secondary coil windings. For connecting the ignition coil 12 to the tester, a "primary coil" cable is provided having test leads designated 16a and 16b respectively connected to the coil primary (+) and ground (−) terminals. A "secondary coil" cable designated 18 is connected to the high tension output of coil 12.

The block diagram illustration of FIG. 1 of the tester of this invention includes a D.C. power supply 22 adapted to be connected to a conventional 117 volt 60 cycle source by a power cord designated 24. Power supply 22 provides 12 volts direct current output corresponding to a vehicle battery power supply to a power supply line designated 26. A normally open "press to test" switch indicated at 28 is connected in series with line 26. D.C. power is supplied to a relaxation type oscillator circuit designated 32 as indicated by line 34 and a transistor switching circuit 36 as indicated by line 38. Switching circuit 36 provides the same switching operation as a pair of breaker contacts as described in the aforementioned B. H. Short Pat. 3,218,513. Circuit 36 is operated at a rate corresponding to the frequency of the oscillator output voltage pulses applied over oscillator output line 42.

Located also within the tester is an internal semiconductor amplifier 44 and internal ignition coil 48 each being substantially identical, respectively, to the semiconductor ignition amplifier 10 and ignition coil 12 to be tested. A function selector switch generally designated by numeral 50 includes four sets of "ganged" single pole two position switches having simultaneously operated switch arms 52, 54, 56 and 58.

With function selector switch 50 in the lower or "coil" test position, as illustrated in FIG. 1, the D.C. power supply line 26 supplies D.C. power to the power input line 62 of internal ignition amplifier 44 through switch arm 52. The output line 64 of transistor switch circuit 36 is connected through switch arm 54 to the control input of internal amplifier 44 as indicated by line 66. Switching circuit 36 connects and disconnects output line 64 with the circuit ground reference point 70 connected to circuit 36 by line 72. The power output of internal amplifier 44 is connected by the line designated 74 through switch arm 56 to the coil test lead 16a and the (+) primary coil terminal of ignition coil 12 under test. The coil ground (−) terminal of coil 12 is connected to the tester ground point 70 through test lead 16b, switch arm 58 and the grounded reference line designated 76. The high tension output from the ignition coil 12 under test is supplied to the cable test lead designated 18 to a stepdown transformer and demodulator circuit designated 80 by the line indicated at 82. A meter circuit designated 84 including a visually mounted meter indicated at 86 is connected to the circuit 84 as indicated by line 88.

For testing the ignition amplifier 10 under test, the switch arms of function selector switch 50 are in an upper or "amplifier" test position and the output of transistor switching circuit 36 is supplied through line 64, switch arm 54, and test lead 14c to the control input of amplifier 10. The D.C. power line 26 is connected to the amplifier power input test lead 14a through switch arm 52. The power output test lead 14b is directly coupled within the tester to the primary coil input of internal coil 28 as indicated by line 90 which is a continuation of lead 14b. Ground (−) terminal of internal coil 48 is connected through the line designated 92, switch arm 58 (being in the upper position), ground line 76 to the tester circuit ground reference point 70. The high tension output from the secondary winding of internal coil 48 is supplied through line designated 94 to line 82 and the transformer and demodulator circuit 80 and meter circuit 84 as described hereinabove in connection with the arrangement for testing ignition coil 12 under test.

From the foregoing, it will be apparent that with function selector switch 50 in the lower or "coil" test position and the switch 28 closed, oscillator 32 provides periodic pulses to operate switching circuit 36 and in turn the internal ignition amplifier 44 is biased conductive and nonconductive. The ignition coil 12 under test is periodically energized by current flow from supply line 26 to produce high tension output voltages which are applied to the meter circuit 84. A visual indication of the coil output voltage is provided on meter 86 and accordingly the condition of the ignition coil under test is satisfactory if above a predetermined value of 6 kilovolts, for example. Similarly, with the function switch 50 in the upper or "amplifier" test position, the ignition amplifier 10 under test is connected to the primary winding of the internal ignition coil 48 and if the coil 48 is being properly charged and discharged by the amplifier circuit a satisfactory coil output voltage is indicated by the meter circuit.

The tester hereinabove described in general terms in connection with FIG. 1 is shown in more detail in FIG. 2. The reference numerals indicating the block diagrams in FIG. 1 are included in FIG. 2 to identify circuits represented by such blocks and lead wires corresponding to the lines described in connection with FIG. 1 are also designated by the same numerals in FIG. 2.

It is understood that the circuits illustrated schematically in FIG. 2 are suitably mounted on a chassis within a tester housing having a panel section, a portion thereof being indicated by the phantom line 100. Test lead sockets 102a 102b and 102c are mounted in the panel section 100 for receiving the external "amplifier" cable test leads 14a, 14b and 14c respectively. Sockets 104a and 104b are provided for connecting an external "primary coil" cable having test leads 16a and 16b to the tester. A high voltage socket 106 suitably insulated from the panel section 100 and capable of withstanding voltages of 40 kilovolts is provided to receive the "secondary coil" cable 18. Test cable lead 18 includes high voltage probe 108 having a static charge shield 108a which engages ground clips 106a of socket 106. Clips 106a are in electrical contact with the housing panel 100 which is connected to the circuit ground point 70 by means not shown. Accordingly, cable 18 is grounded to eliminate static charge accumulation which may be produced by the high tension coil output that has an open circuit terminal voltage of approximately 30 kilovolts. The test leads are provided with clip terminal ends opposite the socket mating ends for connection to the terminals of the amplifier 10 and coil 12.

The D.C. power supply 22 is shown in the lower right hand corner of FIG. 2. Power cord 24 extends externally to the tester housing and includes a pair of lead wires adapted to be connected to a conventional 117 volt 60 cycle source and may also include a conventional grounding wire 112 for added protection. The two lead wires of power cord 24 are connected in series with a "power" switch 114 and the primary winding of a step-down transformer 116. The secondary winding output terminals of transformer 116 are connected to the input terminals 120 and 122 of a rectifier bridge circuit generally designated 124. Bridge circuit 124 includes four semiconductor diodes each capable of conducting ten amperes and connected in a conventional full wave bridge arrangement as illustrated. The output voltage of transformer 116 is approximately 18 volts to the rectifier bridge inputs 120 and 122. A pilot light 126 is connected across a suitable portion of the transformer secondary winding and is lighted when "power" switch 114 is closed to energize the transformer primary.

Bridge output terminals 128 and 130, having a suitable filtering capacitor 132 connected thereacross, are provided with polarities as indicated. Positive (+) terminal 128 is connected through a fuse 134 having a rating of eight amperes to the D.C. supply line lead 26. The negative (—) output terminal 130 is connected in series with a normally open "push to test" switch 28 and a series regulating circuit described further hereinbelow. Switch 28 provides a protection feature during tester operation since power will not be supplied to either the tester circuits or the external sockets or test leads with the switch 28 open. It is understood the switch 28 can be connected in series with either output terminal 128 or 130 and in FIG. 1 switch 28 is shown in series with the positive lead 26 for purposes of illustration.

The regulating portion of power supply 22 includes a conventional series transistor regulator having a voltage dividing input potentiometer 138 connected across the bridge output terminals 128 and 130 through lead 140 connected to fuse 134 and lead 142 connected to switch 28. The tap connection 144 of potentiometer 138 is connected through bias resistor 146 to the base electrode of a PNP transistor 150 having base $b$, emitter $e$ and collector $c$ electrodes. A filter capacitor 152 is connected between the positive power supply terminal of potentiometer 144 and the base of transistor 150. The junction 154 at the collector electrode of transistor 150 is connected to the negative (—) bridge terminal 130 through lead 142 and switch 28 and also to each collector electrode of the three substantially identical parallel connected series regulating PNP transistors each designated 160 and having base $b$, emitter $e$ and collector $c$ electrodes. The emitter to collector current path of each parallel transistor 160 is connected in series with junction 154 by lead wire 162 and the negative (—) supply output line 166 by emitter leads each designated 168. The emitter electrode of transistor 150 is connected by lead wire 164 to each of the base $b$ of the transistors 160. A suitable base biasing resistor 167 is connected between the lead wire 164 and through lead 140 to the (+) bridge terminal 128.

The output of rectifier bridge 124 is applied across potentiometer 138 to suitably bias transistor 150 so that variations in the output voltage varies its conduction. The emitter output of transistor 150 biases each base $b$ of transistors 160 to vary the emitter to collector current flow so that 12 volts direct current is maintained across power supply output lines 26 and 166. The reference voltage is determined by the setting of tap 144 of potentiometer 138 so that when the power supply output voltage rises above 12 volts the current flow through series regulating transistors 160 is decreased and vice versa. It is apparent that parallel transistors 160 may be replaced by a single power transistor capable of conducting a current of at least eight amperes and additional filtering elements may be added as indicated by output filter capacitor 170 connected between leads 26 and 166.

Positive power line 26 supplies lead 34 connected to the oscillator circuit 32 and lead 38 connected to the transistor switching circuit 36 and also provides ignition coil charging current through a conventional ballast resistor 171, switch arm 52 of function switch 50 and either ignition amplifier 10 or 44. Supply line 166 is grounded through junction 172 to ground 70 and also completes the ignition coil charging paths through a second conventional ballast resistor 173, switch arm 58 to either ground (—) terminal of ignition coil 12 or 48.

Oscillator circuit 32 shown in the upper right hand corner of FIG. 2 includes a conventional unijunction transistor 174 having emitter $e$, base-one B–1 and base-two B–2 electrodes. The emitter electrode of unijunction transistor 174 is connected to a junction 176 between RC timing elements including a frequency adjusting potentiometer 178 in series with resistance 180 and a timing capacitor 182. The B–2 electrode is connected through lead wire 184 and resistor 186 to junction 188 also connecting one terminal of potentiometer 178 to positive supply lead 34. The B–1 electrode is connected to ground lead wire 190 which is connected to the ground point 70 through junction 192 and lead wire 72. The unijunction output voltage is connected from B–2 electrode through an output coupling network including series capacitor 194 and resistor 196 and a diode 198 connected in parallel with resistor 196. Resistance 202 is connected in series with the oscillator output lead wire 42 and the junction 204 of parallel resistance 196 and diode 198. Diode 206 is also connected between junction 204 and the ground wire lead 190 in an opposing polarity to diode 198 as illustrated. A parallel resistor 208 is connected across the oscillator output lead wire 42 and ground lead wire 190.

The oscillator circuit operates in the manner of conventional unijunction relaxation oscillators with the frequency adjusting potentiometer 178 being set for an output frequency of 1000 Hz. at the base-two electrode although the frequency setting can be changed if desired.

Transistor switching circuit 36 includes cascade connected driver NPN transistors 210, 212 and power PNP transistor 214, each having base $b$, emitter $e$ and collector $c$ electrodes. Transistors 210, 212 and 214 are suitably biased by resistors 216, 218 and 220 connected between the positive supply lead 38 and the respective base electrodes. Emitter electrodes of transistors 210 and 212 and the collector electrode of transistor 214 are connected to the ground wire lead 222 which is connected through junction 192 and wire lead 72 to ground point 70. Transistors 210 and 212 of switching circuit 36 are normally biased nonconductive since the voltages at the base electrodes are positive. Accordingly the power transistor 214 is nonconductive. Oscillator voltage pulses on line 42 are of a negative polarity and are applied to the base of transistor 210 to turn the transistor 210 *on*. As transistor 210 conducts, its emitter to collector current path has a low impedance turning *on* transistor 212 and in turn power transistor 214 is switched *on*. A low impedance path is provided from the switching circuit output lead wire 64 through the emitter to collector path of transistor 214 to the ground lead 222 and ground point 70. It is apparent that the transistor 214 will be switched conductive and nonconductive at the rate of pulse frequency provided by the oscillator circuit 32.

The transistor switching circuit 36 replaces breaker contacts in a vehicle semiconductor ignition system utilizing the breaker contacts to provide an input to an ignition amplifier that provides a closed current path through closed breaker contacts to ground. The output lead wire 64 is connected to switch arm 54 of function selector switch 50 and to either of the control input leads 14c or 66 of the ignition amplifiers 10 and 44, respectively.

An "Amplifier Input" indicator lamp 226 is connected between the switching circuit output lead 64 and junction 172 connected to ground 70. Lamp 226 is lighted by the small voltage drop occurring across the output electrodes of transistor 214 when it is switched *on*. Accordingly an indication is provided that an input is being applied through lead 64 to either the ignition amplifier 10 under test or internal ignition amplifier 44.

The internal semiconductor ignition amplifier 44, as noted hereinabove, is of a type substantially identical to the ignition amplifier 10 under test. Briefly, the amplifier circuit 44 includes a PNP switching transistor 230 having base *b*, emitter *e* and collector *c* electrodes with electrodes *e* and *c* respectively connected to the positive power input line 62 and power output line 74. The base electrode *b* is connected to the junction 232 of a voltage dividing network consisting of resistors 234 and 236 with the other ends of resistors 234 and 236 respectively connected to control input lead 66 and supply lead 62. A Zener diode 240 is connected with the polarity as indicated across the emitter and collector electrodes for protection of transistor 230 from reverse transient voltages caused by ignition coil discharges.

With the switch arms of function selector switch 50 being in the lower or "coil" test position, as illustrated in FIG. 2, lead 62 is connected to the positive voltage supply line lead 26 through switch arm 52. Lead wire 74 is connected through switch arm 56 to the primary coil (+) terminal of an ignition coil 12 to be tested. As noted hereinabove, the control input lead 66 is connected through switch arm 54 to lead 64. Transistor 230 is biased nonconductive with the positive supply voltage on lead 62 and with the transistor 214 of switching circuit 36 being nonconductive. When transistor 214 is conductive current flows through resistances 236 and 234 and causes junction 232 to bias the base electrode of transistor 230 negative with respect to the emitter electrode. The transistor conducts to pass current from lead 62 through the emitter and collector electrodes and to the primary coil winding of ignition coil 12 under test. The current flow charges the ignition coil until transistor 230 is biased *off* by transistor 214 and the stored energy discharges through the high tension secondary coil winding test lead 18.

It is to be understood that the operation of the ignition amplifier 10 is the same as described hereinabove for internal ignition amplifier 44. The test leads 14a, 14b and 14c respectively correspond to leads 62, 74 and 66. With the switch 50 in the upper or "amplifier" position, amplifier 10 will pass current through lead 90 to the primary of internal ignition coil 48 in response to the transistor switching circuit 36 as explained hereinabove in connection with internal amplifier 44 and ignition coil 12. Accordingly, the secondary coil winding output of coil 48 occurs on lead 94 and both coil high tension outputs are connected to junction 240 and lead 82 to the transformer and demodulator circuit 80.

The circuit generally designated by numeral 80 includes a step-down transformer 244 having in a preferred embodiment an eighty-to-one primary to secondary winding ratio. Lead wire 82 connects the junction 240 through a high voltage capacitor 246 to the primary winding input terminal 248. The insulated lead 242 connecting socket 106 with junction 240 and insulated lead 94 are capable of withstanding at least 30 kilovolts and the wire lead 82 is made as short as possible in a preferred embodiment. The opposite primary winding terminal 250 is internally connected to the secondary winding terminal 252 which is also connected to the outer conductor of coaxial cable 256. Secondary terminal 258 is connected to the center conductor of cable 256.

A demodulator circuit designated generally at 260 is connected to the output of transformer 244 by wire leads 262 and 264 respectively connected to the center conductor and outer conductor of coaxial cable 256. Demodulator circuit 260 includes a resistor 266 having a resistance value of three megohms and a diode 268 that are connected in series with lead 262 and output lead 88. Parallel connected one megohm resistor 270, filter capacitor 272 and diode 274 are connected across the output lead wire 88 and lead wire 264, the latter wire being connected to output lead wire 280. Output lead wires 88 and 280 constitute the input leads to meter circuit 84.

The transformer and demodulator circuit arrangement provides a load of approximately one megohm and fifty micro-micro farads for both the ignition coil outputs which are normally in the order of 7 kilovolts when connected to such a load which is substantially equivalent to a corresponding ignition system load. The high voltage is stepped down by transformer 244 and the demodulator circuit 260 substantially dissipates the coil discharge current in the demodulator resistors and rectifies the secondary winding output of transformer 244 before applying it to the meter circuit 84. The arrangement reduces potentially hazardous voltage conditions and radiation interference in the meter circuit.

Meter circuit 84 includes a conventional solid state voltmeter circuit including a field effect transistor device 282 having conventional gate G, source S, and drain D electrodes connected in a resistance bridge network. The bridge input terminals 284 and 286 are connected to a battery source 288 and series switch 290. A meter 86, for example a 200 micro ampere D.C. meter, is connected in series with a meter-range calibrating potentiometer 292 and across the bridge output terminals 294 and 296. A diode 298 is also connected across the terminals 294 and 296 to protect the meter 86 from reverse polarity current flow. The S and D electrodes of field effect transistor 282 are connected between bridge terminals 284 and 294 so that the circuit path between the electrodes forms one arm of the resistance bridge. Resistor 298 forms one bridge arm adjacent transistor electrode D while resistor 300 forms the opposite bridge arm. Resistor 302 and potentiometer 304 complete the bridge circuit. Potentiometer 304 is adjusted for a "zero" reading on the meter 86. The input to meter circuit 84 is connected to wire lead 88 to a junction 306 connected with one end of resistor 308 and a filter capacitor 310 having its other end connected to a junction 312 which is common to demodulator output lead 280 and bridge terminal 286. The second end of resistor 308 is connected to the gate electrode G of transistor 282 so that the demodulator rectified output voltage on lead 88 gates the transistor to control the impedance between the D and S electrodes. Normally the meter circuit load impedance across the leads 88 and 280 is sufficiently high to not effect the operation or impedance loading of the transformer and demodulator circuit 80. The potentiometer 292 is adjusted for a zero meter reading with battery switch 290 closed. With a normal ignition coil discharge, which is stepped-down by transformer 244 and rectified by demodulator circuit 260, a direct current voltage is applied to the gate electrode of field effect transistor 282. The impedance between the drain D and source S electrodes decreases substantially and the change of impedance causes current flow through meter 86 to provide a meter reading which is proportional to the ignition coil output voltage. In a preferred embodiment the meter is calibrated so that a meter indication proportional to 6 kilovolts or above indicates that the ignition coil output is satisfactory.

From the foregoing it is apparent that an ignition amplifier 10 under test or ignition coil 12 under test is dynamically tested in a circuit combination respectively with an internal ignition coil 48 or internal ignition amplifier 44. Both the internal coil 48 and internal amplifier 44 are known to be in satisfactory condition so that in testing of an ignition coil 12 it is properly energized through function switch 50. If the coil 12 is defective, for example, by having an open or short circuit in either of the primary or secondary coil windings, the high tension output indicated by meter 86 will be below a predetermined satisfactory voltage, 6 kilovolts, for example.

In the test of an ignition amplifier, the high tension output of internal coil 48 will be low if the amplifier is defective, for example the transistor leakage current between the emitter and collector electrodes is too high or the Zener diode element is defective in by-passing back EMF voltages applied to the transistor. A defective ignition amplifier 10 will not conduct or break the energizing current sufficiently and the ignition coil will fail to build up and discharge the magnetic flux required to produce a satisfactory secondary coil winding high tension output.

The ignition amplifier 10 and coil 12 under test are subjected to severe operation by operation at the 1000 Hz. frequency rate provided by oscillator 32. Any defect which is marginal will normally fail at this frequency which corresponds to higher engine speeds of approximately 9000 r.p.m.

With an ignition amplifier 10 under test connected to the tester by "amplifier" test leads 14a, 14b and 14c and an ignition coil 12 under test connected to the tester by "primary coil" test leads 16a and 16b and "secondary coil" test lead 18 and with power cord 24 connected to a conventional A.C. source through closed switch 114, the tester of this invention is operable to perform dynamic testing of the ignition system components. The 12 volts D.C. corresponding to a vehicle battery power is supplied from power supply 22 to the tester circuits and external components under test only when "press to test" switch 28 is depressed. With function selector switch 50 in the "coil" position and the switch 28 depressed, oscillator circuit 32 supplies 1000 Hz. pulses to transistor switching circuit 36 which operates as would breaker contacts operating at a high engine speed. "Amplifier Input" indicator lamp 226 will flicker to indicate that an input is being applied to internal ignition amplifier 44. The ignition amplifier transistor 230 will accordingly pass charging current up to approximately 8 amperes from the power supply 22 to the primary coil winding of ignition coil 12 under test. The high tension output voltages pass through the cable 18 and socket 106 to the transformer and demodulator load circuit 80. Meter circuit 84 receives the stepped-down and rectified voltage from circuit 80 to provide an indication on meter 86 of the output voltage of the ignition coil 12 until switch 28 is released.

When the function selector switch is moved to the "amplifier" position for testing of ignition amplifier 10 the output of transistor switching circuit 36 is applied to the control input of ignition amplifier 10 with the switch 28 depressed. Charging current is provided through the ignition amplifier 10 in the same manner as described for internal ignition amplifier 44. The charging current is applied to the internal ignition coil 48 which provides a high tension output connected to the transformer and demodulator circuit as described hereinabove for the ignition coil 10 under test. The indication of meter 86 provides a reading of the internal coil output which is satisfactory if the amplifier 10 is operating properly.

While the embodiment of the present invention, as herein disclosed, constitutes a preferred form, it is understood that other fors might be adopted. For example, power supply 22 may be arranged to supply six volts rather than twelve volts to test conventional six volt ignition systems. The semiconductor ignition amplifier 10 to be tested may take forms other than that illustrated in detail in circuit 44. Where voltage pulses rather than breaker contacts are utilized to control a semiconductor ignition amplifier to be tested, the output line 42 of the oscillator 32 may be connected directly to the control input of such ignition amplifiers to supply voltage pulses to the amplifiers that accordingly would replace the ignition amplifiers of circuits 10 and 44.

I claim:

1. A tester circuit for use in testing components of a vehicle internal combustion ignition system of the type utilizing a semiconductor ignition amplifier to control current flow from a direct current power source to an ignition coil, comprising: a first terminal means adapted to connect the tester circuit to a semiconductor ignition amplifier to be tested including a switching transistor circuit having input, output and control circuit connections; a second terminal means adapted to connect the tester circuit to an ignition coil to be tested having input and high tension output circuit connections; an internal semiconductor ignition amplifier including a switching trfansistor circuit substantially identical to the switching transistor circuit of the ignition amplifier to be tested and having input, output and control circuit connections; an internal ignition coil having input and high tension output circuit connections; a control signal source providing electrical signals having a frequency corresponding to a frequency of electrical signals coupled to said semiconductor ignition amplifier to be tested when operating in a vehicle internal combustion ignition system, said electrical signals adapted to be applied to the control circuit connections of said internal amplifier and said amplifier to be tested for biasing said switching transistor circuits conductive at a rate responsive to the frequency of said electrical signals and thereby develop a periodic current flow between the input and output circuit connections of each of said amplifiers when the input and output circuit connections are connected to a source of current; a direct current power source including a pair of output terminals connected in said tester circuit; a selector switch connected in said tester circuit and to said first terminal means and said second terminal means, said selector switch including a first position for connecting said control circuit connection of said amplifier to be tested to said control signal source and connecting the input and output circuit connections of the amplifier to be tested in a series circuit combination including said pair of power source output terminals and the input circuit connection of said internal ignition coil, said selector switch further including a second position for connecting the control circuit connection of said internal amplifier to said control signal source and connecting the input and output circuit connections of the internal amplifier in a series circuit combination including said pair of power source terminals and the input circuit connection of said ignition coil to be tested; a load impedance circuit means including an impedance value substantially equal to the impedance of an ignition coil output circuit of a vehicle internal combustion ignition system utilizing said ignition amplifier to be tested and said ignition coil to be tested having a pair of output lead connections and an input lead connection connected to the high tension output circuit connection of each of said ignition coils; and a meter circuit operatively connected across the output lead connections of said load impedance circuit means to provide an indication of a high tension voltage output applied to said load impedance circuit means from either of said ignition coils depending upon the position of said switch.

2. A tester circuit for use in testing components of a vehicle internal combustion engine ignition system of the type utilizing a semiconductor ignition amplifier to control current flow from a direct current power source to an ignition coil, comprising: a first cable means adapted to connect the tester circuit to a semiconductor ignition amplifier to be tested having input, output and control circuit connections; a second cable means adapted to connect the tester circuit to an ignition coil to be tested having input and high tension output circuit connections; an internal semiconductor ignition amplifier substantially identical to the amplifier to be tested and having input, output and control circuit connections; an internal ignition coil substantially identical to said coil to be tested and having input and high tension output circuit connections; a control signal source providing electrical signals adapted to be applied to the control circuit connection of said internal amplifier and said amplifier to be tested to control current flow between the input and output circuit connections of each of said amplifiers; a direct current power source including a pair of output terminals providing a voltage substantially equal to the voltage utilized in a vehicle ignition system utilizing the components to be tested; a selector switch connected to said tester circuit having first and second switch positions, said selector switch when in said first position connecting said control circuit connection of said amplifier to be tested to said control signal source and connecting the input and output circuit connections of the amplifier to be tested in a series circuit combination including said pair of power source terminals and the input circuit connection of said internal ignition coil, said selector switch when in said second position connecting the control circuit connection of said internal amplifier to said control signal source and connecting the input and output circuit connections of the internal amplifier in a series circuit combination including said pair of power source terminals and the input circuit connection of said ignition coil to be tested; a load impedance circuit means including a step-down transformer having a primary and a secondary winding and a demodulator circuit connected across said secondary winding and further including a pair of output leads connected to said demodulator circuit and an input lead connecting one terminal of said transformer primary winding to the high tension output circuit connection of each of said ignition coils, said load impedance circuit means including an impedance value substantially equal to the impedance of an ignition coil output circuit of a vehicle ignition system utilizing said amplifier to be tested and said ignition coil to be tested, and a meter circuit operatively connected across the output lead connections of said load impedance circuit means to provide an indication of a high tension voltage output applied to said load impedance circuit means from either of said ignition coils depending upon the position of said switch.

3. A tester circuit for use in testing amplifier and coil components of an ignition system of the type utilizing a semiconductor ignition amplifier to provide energizing current flow to an ignition coil from a direct current power source, the combination comprising: an internal ignition amplifier circuit including a switching transistor device having emitter, collector and base electrodes; an internal ignition coil having primary and secondary coil windings; an oscillator circuit producing electrical pulses at a predetermined substantially fixed frequency of at least 1000 Hz.; a transistor switching circuit having an input lead operatively connected to said oscillator circuit, a pair of output leads and a switching transistor having emitter and collector electrodes each connected to one of said pair of output leads, said switching circuit transistor being biased conductive and nonconductive in response to said oscillator signals, a direct current transistor power supply circuit adapted to be connected to an A.C. source and having a pair of output leads for supplying a regulated direct current voltage, said power supply circuit further including a normally open switch serially connected with one of said output leads; a selector switch having first and second switch positions; first and second testing circuit arrangements including first and second terminal means adapted to be connected respectively to an ignition coil to be tested having primary and secondary windings and to a semiconductor ignition amplifier circuit to be tested including a transistor switching device having emitter, collector and base electrodes; said first testing circuit arrangement including said selector switch connecting one of said transistor switching circuit output leads to the base electrode of the switching transistor of said internal amplifier and further connecting the emitter and collector electrodes of the internal amplifier transistor in a series circuit including said pair of power supply output leads and the primary winding of said ignition coil to be tested when said selector switch is in said first position, said second testing circuit arrangement including said selector switch connecting said one output lead of the transistor switching circuit to the base electrode of the switching transistor of said ignition amplifier to be tested and said second testing arrangement further connecting the emitter and collector electrodes of the transistor of said amplifier to be tested in a series circuit including said pair of power supply output leads and the primary winding of said internal ignition coil when said selector switch is in said second position; a load circuit combination including a step-down transformer and demodulator circuit having an input lead and a pair of output leads, said input lead being connected to the secondary winding of each of said internal and tested ignition coils; a solid state voltmeter circuit including input terminals, output terminals and plural branch circuits, one of said input terminals being connected to one of the output leads of said load circuit combination, said output terminals being connected to a visual meter and one of said branch circuits including a field effect transistor having an input electrode operatively connected to said one of the load circuit combination output leads; closing of said power supply switch energizes the ignition coil of one of said testing circuit arrangements at the rate of said oscillator frequency and said voltmeter circuit provides an indication responsive to a high tension output of the ignition coil secondary winding of said one testing circuit arrangement as determined by the position of said selector switch.

References Cited

UNITED STATES PATENTS 2,548,056  4/1951  Powasnick _____ 324—16
3,201,690  8/1965  Embree _____ 324—158

RUDOLPH V. ROLINEC, Primary Examiner

M. J. LYNCH, Assistant Examiner

U.S. Cl. X.R.

324—158; 330—2